Patented Oct. 12, 1948

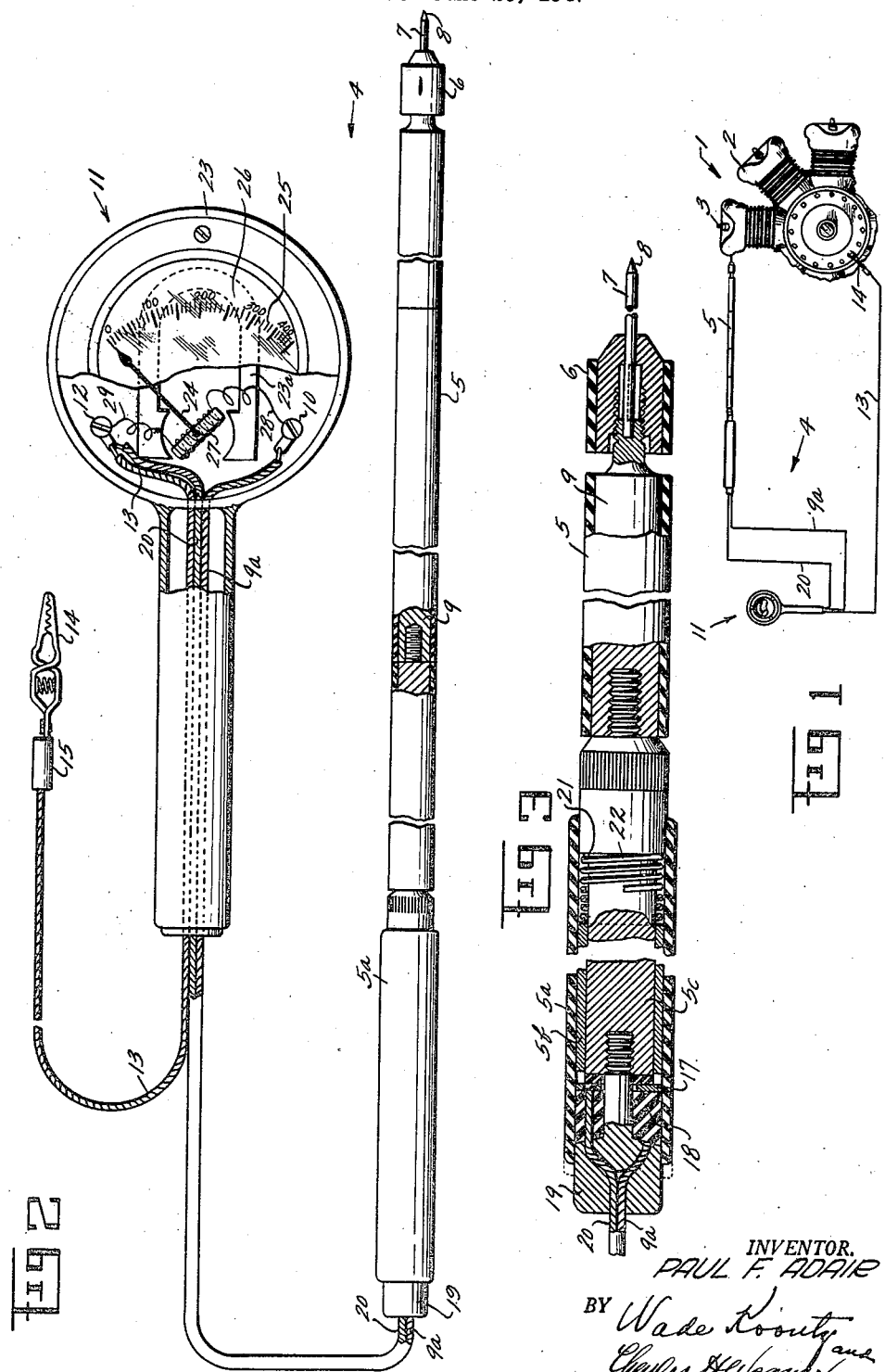

2,450,871

UNITED STATES PATENT OFFICE 2,450,871

RELATIVE TEMPERATURE INDICATOR

Paul F. Adair, Dayton, Ohio

Application June 20, 1947, Serial No. 756,079

7 Claims. (Cl. 73—359)

(Granted under the act of March 3, 1883, as amended April 30, 1928; 370 O. G. 757)

The invention described herein may be manufactured and used by or for the Government for governmental purposes without payment to me of any royalty thereon.

This invention relates to electrical indicating instruments and more particularly to relative temperature indicators, having for an object the provision of a light, simple, compact and easily manipulatable portable instrument for measuring relative temperatures.

An important object is the provision of a simple, inexpensive, portable and compact relative temperature indicating instrument for testing faulty aircraft engine spark plugs and improperly firing cylinders by the "cold cylinder" indicating method to determine and eliminate defective and faulty spark plugs.

To insure trouble-free services and efficient cylinder operation of aircraft internal combustion engines, aircraft spark plugs must be checked for functioning. Rough engine operation, excessive R. P. M. drop during the single ignition check, or high engine manifold pressure for a given R. M. I. during a ground check with the aircraft propeller in full low pitch position are usually caused by faulty or improper firing spark plugs, or "dead" plugs. These faulty plugs, or improperly firing cylinders, will be cooler than the properly firing cylinders and will vary in degrees of temperatures depending upon the condition of the plugs, or by reason of the relative combustion heat liberated in that cylinder as compared to the other cylinders. The use of my improved portable relative temperature indicator readily determines the relative temperatures of the cylinders and spark plugs of multicylinder engines in a minimum amount of time and with a minimum amount of labor and difficulty, so that the defective plugs can be replaced or the difficulty removed to quickly restore the engine to proper and efficient running condition.

A further object is the provision of a simple, portable temperature measuring device, capable of obtaining instantaneous readings of relative temperatures, which can be used to obtain a plurality of rapid temperature indications, varying materially in degree, without the necessity of waiting for the contact end of the instrument to heat or cool between each reading.

A further object is the provision of a portable electrical relative temperature indicating device employing a sensitive electrical relative temperature indicator with means for shunting the indicator out of operating circuit at all times except during actual relative temperature measurements, to reduce or eliminate damage and excessive wear to the indicator due to vibrations or sudden excessive movements of the indicator parts.

A further object is the provision of a portable device for measuring relative temperatures, employing a thermocouple principle in which the metallic parts of the apparatus being measured for relative temperature constitute one of the metallic terminal elements of the two electrically dissimilar metals of the thermocouple arrangement employed in my device.

A further object is the provision of a thin, compact, wand-like testing element, insulated against electrical contact with the apparatus being tested except for the electrical contact end or tip, to prevent temperature determining electrical contacts from being made at any point except at the testing end.

Other objects and advantages of the invention will become apparent from the following description, taken in connection with the accompanying drawings, in which like reference characters refer to like parts in the several figures.

Fig. 1 is a somewhat diagrammatic view showing my improved relative temperature indicating device and its application in testing the functioning of cylinders of a multicylinder aircraft engine;

Fig. 2 is a plan view of my improved testing device;

Fig. 3 is a fragmentary enlarged elevation view of the wand-like testing element of the device, parts being broken away and shown in section.

Referring more particularly in Fig. 1, the reference numeral 1 indicates generally a conventional aircraft engine having cylinders 2 provided with spark plugs or other ignition devices 3 for igniting the combustion charge within the cylinders in the usual manner.

My testing device is indicated generally by the reference numeral 4 and comprises a testing rod or wand-like member 5, preferably about 28" long, having an externally insulated metallic turned tip section 6 with a tapered extremity having a "Constantin" wire rod or central core 7 terminating in a sharp exposed testing or contact tip 8 projecting beyond the tapered end of the tip section 6.

The wand-like body or stem 5 may be formed of Bakelite, rubber or even an aluminum sleeve may be utilized, having a central core of metal constituting a conductor 9 passing to the tip 6 and Constantin rod 7, in insulated relation to the exterior surface of the wand-like body 5. The central core 9 is socketed at its front end to receive the Constantin rod 7 and conventional "clutch" means on the tip 6 secures the Constantin rod 7 in good electrical contact therewith. An insulated conductor wire 9a about six feet long is electrically connected to the rear end of the metallic core 9, the conductor 9a being secured at its other end to the negative terminal 10 of a millivoltmeter or other supersensitive electrical voltage indicating device of the galvanometer type indicated generally at 11. The other or positive terminal 12 of the indicator device 11 is secured to a second insulated flexible electrical conductor 13, the opposite extremity of which has secured thereto a conventional electric battery clip 14, having a handle or manipulating grip portion 15.

Located on the wand-like stem member 5 at the rear or handle mounting portion thereof is a shunt circuit controlling slidable handle 5a and associated contact switch means for normally automatically shunting out the detachable electrical connection 13 to the apparatus being tested, when the Constantin tip 8 is disengaged from the surface of the work or apparatus being tested.

As best seen in Fig. 3, the shunt circuit control switch includes an electrical contact plate 17 located on a cap assembly 19 and insulated sleeve or flange 18 that is fixedly secured on the rear extremity or handle mounting portion of the core 9 of the wand-like body 5, the contact disc 17 being arranged to make an electrical contact with the rear end of the metallic sleeve portion 5b of the handle 5a. The handle 5a is axially slidable on the rear end or handle mounting portion 5c of the core 9 of the body 5 with the metallic sleeve portion 5b thereof in electrical contact with the core 9. A shunt circuit conductor 20, preferably in the form of a flexible insulated wire, is secured in electrical contact at one end with the shunt contact terminal or contact disc 17, the other end of the conductor 20 being secured to either the positive terminal 12 of the gauge device or to electrical conductor 13 at a point adjacent the gauge device 11. The slidable handle portion 5a is preferably in the form of an aluminum sleeve slidably disposed on the core 9 of the body 5 to contact electrically with the contact terminal or disc 17 when the handle is moved rearwardly.

The body 5 is provided with a fixed or integral spring seat in the form of a flange or shoulder 21, a light compression spring 22 being interposed between the flange 21 and the forward end of the metallic sleeve portion 5b of the slidable handle 5a, tensioning the handle rearwardly toward the cap assembly 18 and 19 and normally causing engagement between the rear end of the metallic sleeve of the handle and the shunt circuit contact terminal or disc 17.

While I have disclosed the indicator device 11 as being separate from the testing stem and connected thereto only by the flexible conductors 9a and 29, so that the indicator device may be held by the operator in one hand while he manipulates the testing stem with the other hand, it is within the purview of my invention to mount the indicator directly on the rear end of the testing stem 5, in which event it would be necessary to provide a single flexible conductor taking the place of the conductor 13. The shunt circuit conductor 20 as well as the other lead to the indicator would not be required to be exposed or flexible. The substituting of different quickly detachable dials 26 each calibrated specifically for the specific metal to which the tip 8 is to be applied is also contemplated.

Briefly describing the galvanometer indicating device 11, it comprises a suitable case 23 in which a permanent magnet 23a is secured, a shaft journalled in the case carries a pointer 24 thereon, arranged to register with predetermined calibrated indicia 25 located on the dial 26 of the indicator device. A field coil 27 is secured on the pointer shaft in conventional manner, the ends of the two electrical conductors 9a and 13 being connected to binding posts or terminals 10 and 12, the terminals 10 and 12 respectively being connected to flexible conductors 28 and 29 within the case 23, which are in turn connected to the opposite ends of the field coil 27. A suitable hair spring (not shown) is secured between the pointer carrying shaft device and the case structure to return the pointer to zero position after each reading.

In order to make the device more compact I prefer to construct the wand-like body 5 in a plurality of sections as best seen in Figs. 2 and 3, the sections of the metallic central core or conductor 9 being threaded and socketed together at their opposite ends so that the device can be easily disassembled for packing and storage in the tool kit or assembled for immediate use.

In calibrating the device the indicia 25 is preferably in numerical form, such as, for instance, from 0 to 400 as illustrated in the drawings although when testing only one kind of metal, calibrations can be made to indicate actual temperature direct. By employing a suitable relative temperature chart calibrated in relative temperatures corresponding to the indicia numbers for the particular apparatus or metal on which the device is to be used, a fairly accurate range of comparative temperatures can be determined.

In using the relative temperature indicator device, for instance on aircraft engines to determine which of the cylinders are functioning properly by determining the relative temperatures of the cylinders, spark plugs, or associated parts, the aircraft should be headed directly into the wind to minimize irregular cooling of the individual cylinders and parts. The ignition system is preferably checked to determine that high tension current is reaching the plugs, also the cowl flaps should be open to reduce excessive heat radiation to the various elements of the engine which would effect the relative temperature readings on the indicator 11. The engine should be started and operated under load conditions until the engine temperatures are stabilized. Of course, if the engine operates "rough" or uneven at some particular speed or load condition, it is preferable to duplicate this condition as nearly as possible during the heat-up period and prior to the testing period. When the stabilized or maximum cylinder head temperatures are reached the engine is stopped and the battery clip 14 forming the "cold" indicator lead or conductor is clipped to any suitable or convenient metallic ground on the engine as shown in Fig. 1. The Constantin tip 8 is then quickly applied to the cylinder head of each cylinder, as indicated in Fig. 1, the operator using the device presses forwardly on the handle member 5a, causing the handle to slide forwardly relative to the shunt circuit contact 17, moving the contact sleeve 5b away from the contact disc 17, interrupting the shunt circuit. A reading is immediately available on the indicator 11 which should be noted. Preceding in succession, starting at number 1 cylinder, a typical example of relative temperature indications is determined as follows, after comparative reference is made between the indicia 25 as noted on the indicator 11 and a suitably calibrated comparative temperature chart for the metal tested, not shown.

| Cylinder: | Temperature | Cylinder: | Temperature |
|---|---|---|---|
| 1 | 180 | 10 | 150 |
| 2 | 170 | 11 | 150 |
| 3 | 170 | 12 | 145 |
| 4 | 165 | 13 | 150 |
| 5 | 160 | 14 | 145 |
| 6 | 100 | 15 | 60 |
| 7 | 155 | 16 | 145 |
| 8 | 70 | 17 | 140 |
| 9 | 150 | 18 | 115 |

The above readings indicate that cylinders 6 and 18 are firing intermittently while cylinders 8 and 15 are not firing and the plugs in the magneto circuit being used are probably "dead." By switching to the other magneto circuit in dual ignition system engines and repeating the aforesaid testing process the condition of the plugs in the other circuit is immediately ascertained.

Since the thermocouple junction is between the metal of the work such as the cylinder head or spark plug and the extreme tip of the Constantin terminal 8 an immediate reading is available at the galvanometer indicator 11 and there is substantially no objectional time delay between initial contact and full galvanometer indications as is the case in the conventional two-wire thermocouple indicators. Readings can be taken successively on different parts of the work, as quickly as the operator can transfer the tip application from one cylinder or engine part to another.

Normally the removal of the tip from the work would allow the indicator hand to be snapped back to zero position by the hair spring, causing excessive wear and possible damage or shorter life to the delicate parts of the indicator, but in my improved arrangement, utilizing my automatic shunt circuit, a dampening action on the return movement of the indicator pointer is effected since, as the outward pressure on the handle 5a must be relieved prior to lifting the tip 8 from the work, the compression spring 21 slides the handle 5a rearwardly while the thermocouple contacting relation with the work is still maintained, until the shunt circuit contact 17 is engaged by the internal contact sleeve 5b of the manipulating handle, establishing the shunt circuit through the shunt wire 20 across the field coil 27. This always occurs before the main test circuit through the wires 9a and 13 is broken by the removal of the tip 8 from the work. The indicator hand 24 is thus quickly returned to zero position in plenty of time for the next reading as the current "leaks off," but return movement of the pointer is dampened and the pointer is prevented from being violently returned to zero position.

The disclosure illustrated in the drawings and described herein should be taken in an exemplary sense rather than a restricted or limited sense, since it is obvious that various changes and modifications may be made without departing from the spirit of the invention as defined in the accompanying claims.

I claim:

1. In a portable testing device for electrically determining relative temperatures of different portions of an electrically conductive metallic apparatus; electrically responsive gauge means calibrated to indicate relative temperatures in predetermined ratio to electrical current impressed on the gauge means; a pair of electrical conductors connected to the gauge means for the actuation thereof; a connector on one of said conductors for detachably connecting the same electrically to the apparatus to be tested; a testing contact member comprising a stem; a manipulating handle therefor; a contact tip on the end of the stem for electrical contact with portions of the apparatus to be tested for relative temperatures, composed of metal dissimilar from the metal of the portions of the apparatus to be contacted thereby and electrically connected to the other of the aforesaid electrical conductors, whereby the dissimilar metals at the tip and in the apparatus in contact with the tip constitute a thermocouple at the instant of contact, utilizing the electrically conductive portions of the apparatus being tested between the contacting tip and the detachable conductor to complete the thermocouple circuit to the gauge means; and a normally closed shunt circuit between the two conductors including means for interrupting said shunting circuit after said contact tip is brought into testing contact with the portions of said apparatus to be tested.

2. In a relative temperature testing and indicating device of the class described; an elongated testing stem member having a testing tip at one end for contact with metallic apparatus to be tested for temperatures and composed of metal electrically dissimilar to the portion of the metallic apparatus aforesaid to form a thermocouple contacting relation between the tip and apparatus at the instant of contact therewith; an associated electrical energy responsive gauge device calibrated for determining relative temperatures in predetermined ratio to the aforesaid thermocouple temperature relations between the tip and the contacted portions of the apparatus being tested; an electrical connection between the gauge device and said contact tip; a separate flexible electrical conductor connected to the gauge device at one end having a detachable connector secured thereon at the other end for detachable connection with apparatus to be tested at a point spaced from the portions to be contacted by said contact tip to establish a closed thermocouple circuit to the contact tip through the portion of the apparatus between the detachable connector and the contact tip when in temperature testing contact with the apparatus aforesaid, including a normally closed shunt circuit connected electrically between said tip and said detachable connector normally shunting out of said gauge means, and switch means on said testing stem movable in one direction to open said normally closed shunt circuit.

3. In a relative temperature testing and indicating device of the class described; an elongated testing stem member having a testing tip at one end for contact with metallic apparatus to be tested for temperatures and composed of metal electrically dissimilar to the portion of the metallic apparatus aforesaid to form a thermocouple contacting relation between the tip and apparatus at the instant of contact therewith; an associated electrical energy responsive gauge device calibrated for determining relative temperatures in predetermined ratio to the aforesaid thermocouple temperature relations between the tip and the contacted portions of the apparatus being tested; an electrical connection between the gauge device and said contact tip; a separate flexible electrical conductor connected to the gauge device at one end having a detachable connector secured thereon at the other end for detachable connection with apparatus to be tested at a point spaced from the portions to be contacted by said contact tip to establish a closed thermocouple circuit to the contact tip through the portion of the apparatus between the detachable connector and the contact tip when in temperature testing contact with the apparatus aforesaid, including a shunt circuit connected electrically between said contact tip and said detachable connector; switch means in said shunt circuit for interrupting said shunt circuit; a handle member movably carried by said testing stem to open said shunt circuit switch means when the handle member is moved in one direction relative to the stem member; and resilient means between the handle member and the stem for moving the handle member in the opposite direction to normally close said shunt circuit switch means.

4. In a relative temperature testing and indicating device of the class described; an elongated testing stem member having a testing tip at one end for contact with metallic apparatus to be tested for temperatures and composed of metal electrically dissimilar to the portion of the metallic apparatus aforesaid to form a thermocouple contacting relation between the tip and apparatus at the instant of contact therewith; an associated electrical energy responsive gauge device calibrated for determining relative temperatures in predetermined ratio to the aforesaid thermocouple temperature relations between the tip and the contacted portions of the apparatus being tested; an electrical connection between the gauge device and said contact tip; a separate flexible electrical conductor connected to the gauge device at one end having a detachable connector secured thereon at the other end for detachable connection with apparatus to be tested at a point spaced from the portions to be contacted by said contact tip to establish a closed thermocouple circuit to the contact tip through the portion of the apparatus between the detachable connector and the contact tip when in temperature testing contact with the apparatus aforesaid, including a shunt circuit connected electrically between the said contact tip and the said detachable connector; switch means in said shunt circuit for interrupting said shunt circuit; a handle member axially movable on said stem toward said contact tip to open said shunt circuit switch means; and resilient means operable between the handle member and the stem for moving said handle member axially on said stem away from said contact tip to simultaneously move said shunt circuit switch to closing position.

5. In a device for testing relative temperatures of portions of a metallic apparatus, an elongated testing stem having a testing end and a manipulating handle end; a single testing contact terminal on the testing end of the stem composed of a metal dissimilar to the metal of the portions of the metallic apparatus to be tested for temperature to form a thermocouple terminal with the metal being contacted at the point of contact; an insulated electrical conductor connected electrically to said contact terminal and extending through said stem to the handle end thereof; an associated temperature determining gauge means having two contact terminals and responsive to predetermined electrical energy and calibrated to determine predetermined temperatures in ratio to predetermined amounts of electrical energy applied thereto, an electrical conductor between one terminal of the gauge means and the insulated electrical conductor, a second flexible electrical conductor connected to the other terminal of the electrical gauge means at one end; detachable electrical contact means at the opposite end of the second flexible electrical conductor for detachably connecting the same to the metal of the apparatus being tested in remote relation to the point of contact of the single contact terminal with the portions of the apparatus being tested; a manipulating handle mounted on the handle portion of the stem for axial movement toward and away from the testing end aforesaid; resilient means between the stem and the handle for urging the handle rearwardly away from the testing end of the stem; a shunt circuit between the said electrical conductors to the gauge means aforesaid; and switch means in said shunt circuit comprising circuit closing contact means between the handle portion of the stem and the manipulating handle, disposed in closed position when said handle is moved rearwardly by said resilient means, and opened by forward handle movement when said handle is moved forwardly relative to the stem after contacting engagement of the tip of the stem with the portion of the apparatus being tested for relative temperature.

6. In a relative temperature indicating device; an elongated contact stem having a contact tip portion at one end for contact with metallic portions of electrically conductive apparatus being tested to determine the relative temperatures thereof and a handle mounting portion at the other end; said contact tip portion being composed of metal dissimilar from the portions of the apparatus being tested to form a thermocouple between the contacted portions of the apparatus and the tip portion at the instant of contact of the said tip portion therewith; a handle member axially shiftable on said stem; resilient means between the handle member and the stem for moving and tensioning said handle member rearwardly on said stem; electrically responsive relative temperature indicating gauge means operatively associated with said contact stem including a pair of electrical conductors for supplying electrical energy to said gauge means; an electrical connection between one of said conductors and the said electrical contact terminal of the stem; an electrical connecting means the other of said electrical conductor for detachable connection thereof with the metal of the apparatus being tested to form a testing circuit to the juncture of the dissimilar metals of the tested portion and the contact tip which is completed through the metal of the apparatus being tested; switch contact means between the contact stem manipulating handle mounting portion and the axially shiftable handle, disposed to be closed when said shiftable handle is moved rearwardly and opened by forward movement of the shiftable handle; and a shunt circuit connecting said switch device with both of said electrical conductors from the gauge means.

7. Apparatus as claimed in claim 6 in which the testing stem is composed of a plurality of interconnected electrically conductive sections detachably secured together intermediate the contact tip and handle mounting ends of the stem.

PAUL F. ADAIR.

REFERENCES CITED

The following references are of record in the file of this patent:

UNITED STATES PATENTS

| Number | Name | Date |
|---|---|---|
| 1,094,530 | Clawson | Apr. 28, 1914 |
| 2,144,858 | Smith | Jan. 24, 1939 |
| 2,422,124 | Obermaier | June 10, 1947 |

FOREIGN PATENTS

| Number | Country | Date |
|---|---|---|
| 702,856 | Germany | Feb. 18, 1941 |